United States Patent
Leppänen et al.

(10) Patent No.: US 11,443,487 B2
(45) Date of Patent: Sep. 13, 2022

(54) METHODS, APPARATUS, SYSTEMS, COMPUTER PROGRAMS FOR ENABLING CONSUMPTION OF VIRTUAL CONTENT FOR MEDIATED REALITY

(71) Applicant: Nokia Technologies Oy, Espoo (FI)

(72) Inventors: Jussi Leppänen, Tampere (FI); Arto Lehtiniemi, Lempaala (FI); Sujeet Shyamsundar Mate, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/625,900

(22) PCT Filed: Jun. 19, 2018

(86) PCT No.: PCT/FI2018/050476
§ 371 (c)(1),
(2) Date: Dec. 23, 2019

(87) PCT Pub. No.: WO2019/002673
PCT Pub. Date: Jan. 3, 2019

(65) Prior Publication Data
US 2020/0160600 A1 May 21, 2020

(30) Foreign Application Priority Data
Jun. 30, 2017 (EP) .................... 17179022

(51) Int. Cl.
*G06T 19/00* (2011.01)
*G06F 3/01* (2006.01)
(Continued)

(52) U.S. Cl.
CPC ............ *G06T 19/003* (2013.01); *G06F 3/011* (2013.01); *G06F 3/16* (2013.01); *H04S 7/303* (2013.01); *H04S 2400/11* (2013.01)

(58) Field of Classification Search
CPC .......... G06T 19/003; G06F 3/011; G06F 3/16; H04S 7/303; H04S 2400/11
See application file for complete search history.

(56) References Cited

U.S. PATENT DOCUMENTS

| 5,959,597 A | 9/1999 | Yamada et al. |
| 2011/0157327 A1* | 6/2011 | Seshadri ............. H04N 21/235 348/51 |

(Continued)

FOREIGN PATENT DOCUMENTS

EP 3255905 A1 12/2017

OTHER PUBLICATIONS

Office action received for corresponding European Patent Application No. 17179022.3, dated Nov. 25, 2020, 6 pages.

(Continued)

*Primary Examiner* — Sing-Wai Wu
*Assistant Examiner* — Khoa Vu
(74) *Attorney, Agent, or Firm* — Harrington & Smith

(57) ABSTRACT

A method comprising: switching between a first mode for controlling a relative position of a virtual sound object from a notional listener in a virtual space in dependence upon a point of view of the notional listener and a second mode for controlling the relative position of the virtual sound object from the notional listener in the virtual space in dependence upon the point of view of the notional listener, wherein during the first mode there is a higher dependency of the relative position of the virtual sound object from the notional listener upon a currently determined relative position of the virtual sound object from the notional listener in the virtual space based on the current measured location of a user in a real space and during the second mode there is a lower dependency of the relative position of the virtual sound object from the notional listener upon a currently determined (Continued)

relative position of the virtual sound object from the notional listener in the virtual space based on the current measured location of the user in the real space.

20 Claims, 8 Drawing Sheets

(51) Int. Cl.
*G06F 3/16* (2006.01)
*H04S 7/00* (2006.01)

(56) References Cited

U.S. PATENT DOCUMENTS

| | | | | |
|---|---|---|---|---|
| 2014/0328505 | A1* | 11/2014 | Heinemann | G06F 3/017 381/303 |
| 2015/0010169 | A1* | 1/2015 | Popova | H03G 3/20 381/107 |
| 2015/0382129 | A1* | 12/2015 | Florencio | H04R 5/04 381/303 |
| 2016/0260251 | A1* | 9/2016 | Stafford | G02B 27/0101 |
| 2017/0059601 | A1* | 3/2017 | Miller | G01S 5/0294 |
| 2018/0097493 | A1* | 4/2018 | Weksler | H04R 3/04 |

OTHER PUBLICATIONS

"Sony's 'Joshua Bell VR Experience' on PSVR is Among the Best VR Video You'll Find on Any Headset", Road Tovr, Retrieved on Dec. 5, 2019, Webpage available at : https://www.roadtovr.com/now-psvr-sonys-joshua-bell-vr-experience-among-best-vr-video-youll-find-headset/.

Extended European Search Report received for corresponding European Patent Application No. 17179022.3, dated Aug. 28, 2017, 8 pages.

International Search Report and Written Opinion received for corresponding Patent Cooperation Treaty Application No. PCT/FI2018/050476, dated Jul. 24, 2018, 11 pages.

\* cited by examiner

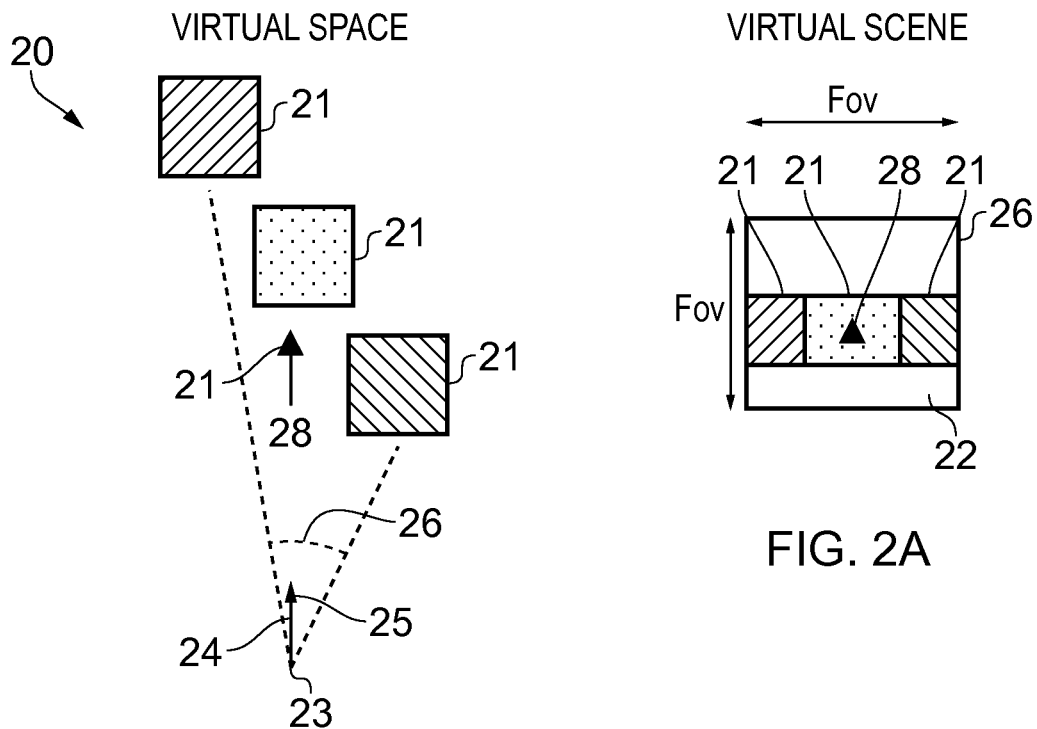
FIG. 1A
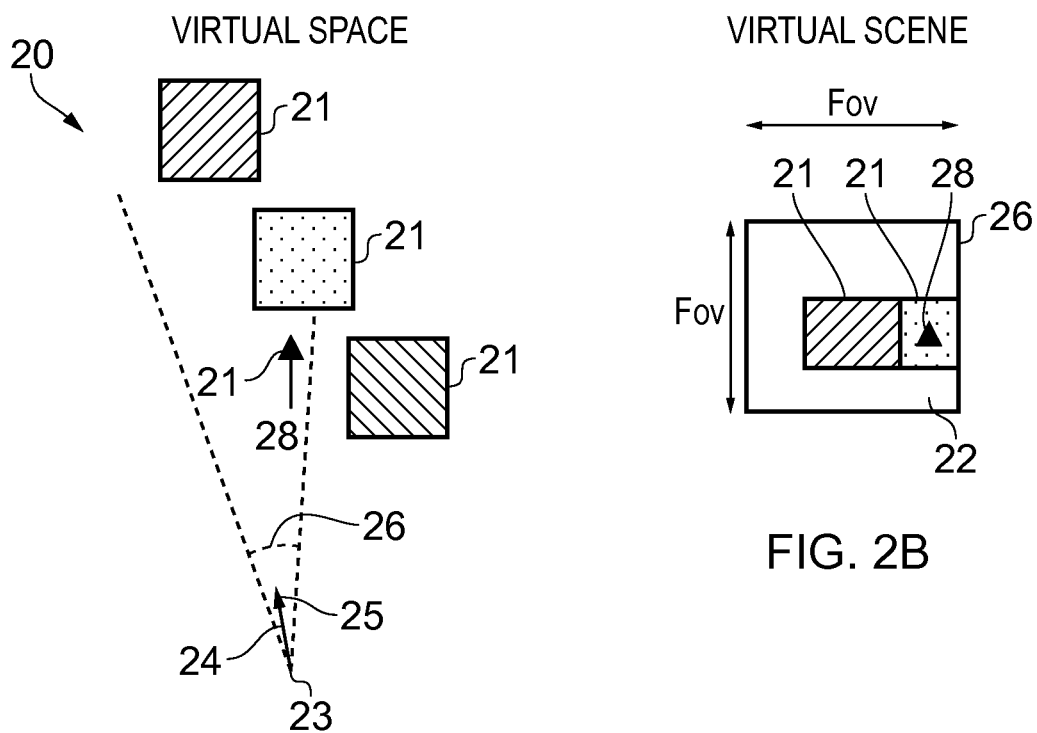
FIG. 2A
FIG. 1B
FIG. 2B

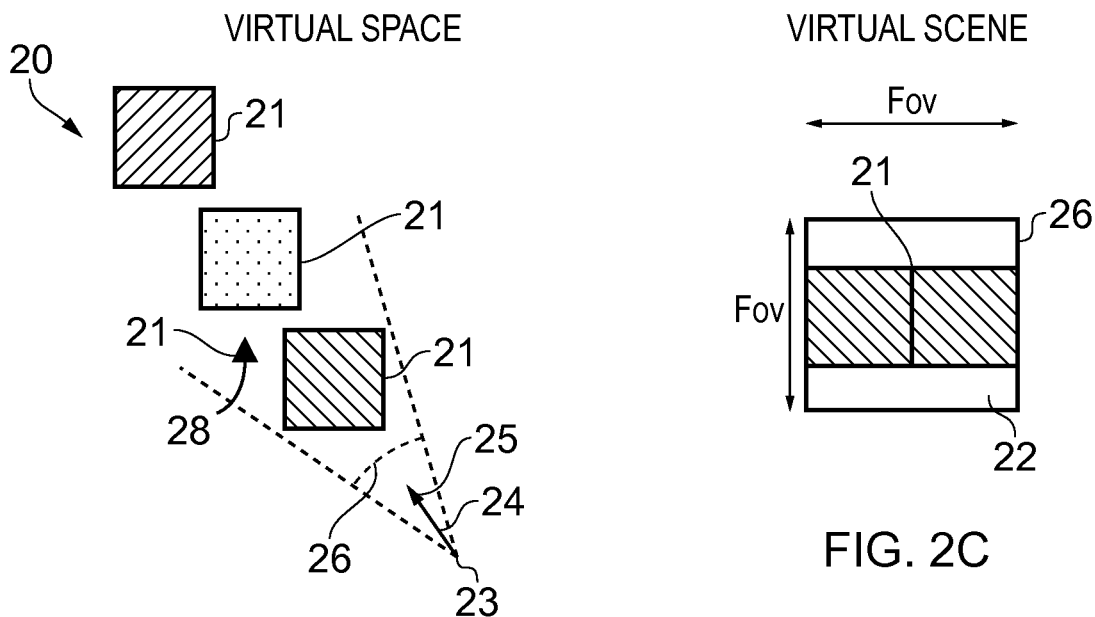
FIG. 1C
FIG. 2C
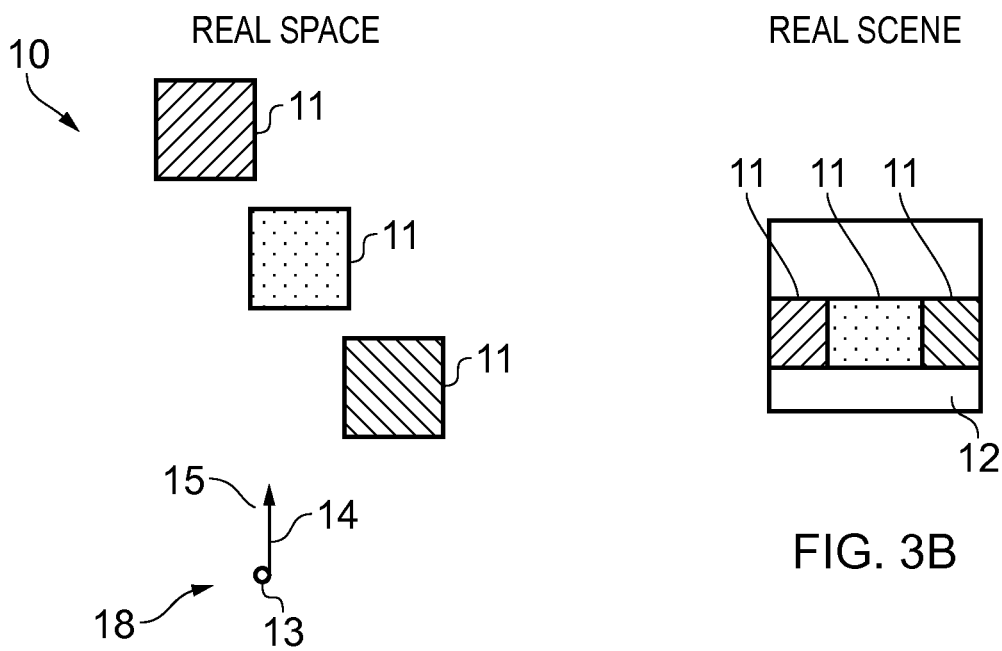
FIG. 3A
FIG. 3B

US 11,443,487 B2

METHODS, APPARATUS, SYSTEMS, COMPUTER PROGRAMS FOR ENABLING CONSUMPTION OF VIRTUAL CONTENT FOR MEDIATED REALITY

RELATED APPLICATION

This application was originally filed as PCT Application No. PCT/FI2018/050476, filed on Jun. 19, 2018, which claims priority from EP Application No. 17179022.3, filed on Jun. 30, 2017.

TECHNOLOGICAL FIELD

Embodiments of the present invention relate to methods, apparatus, systems, computer programs for enabling consumption of virtual content for mediated reality.

BACKGROUND

"Mediated reality" describes when a user experiences a fully or partially artificial environment (a virtual space) as a virtual scene at least partially rendered by an apparatus to a user. The virtual scene is determined by a virtual position within the virtual space.

First person perspective-mediated reality is mediated reality in which the user's real position in a real space determines the virtual position within the virtual space.

In some implementations, the user's orientation in a physical space determines the virtual orientation within the virtual space but the user's location in the real space does not determine the virtual location within the virtual space.

In some implementations, the user's orientation in a physical space determines the virtual orientation within the virtual space and the user's location in the real space determines the virtual location within the virtual space.

Uncertainties in measuring the correct real position in the real space, may result in incorrect virtual positions within the virtual space.

BRIEF SUMMARY

According to various, but not necessarily all, embodiments of the invention there is provided a method comprising:
switching between a first mode for controlling a relative position of a virtual sound object from a notional listener in a virtual space in dependence upon a point of view of the notional listener
and a second mode for controlling the relative position of the virtual sound object from the notional listener in the virtual space in dependence upon the point of view of the notional listener, wherein
during the first mode there is a first dependency of the relative position of the virtual sound object from the notional listener upon a currently determined relative position of the virtual sound object from the notional listener in the virtual space based on the current measured location of a user in a real space and
during the second mode there is a second dependency of the relative position of the virtual sound object from the notional listener upon a currently determined relative position of the virtual sound object from the notional listener in the virtual space based on the current measured location of the user in the real space,
wherein the first dependency is a higher dependency than the second dependency.

According to various, but not necessarily all, embodiments of the invention there is provided an apparatus comprising:
means for, switching between a first mode for controlling a relative position of a virtual sound object from a notional listener in a virtual space in dependence upon a point of view of the notional listener
and a second mode for controlling the relative position of the virtual sound object from the notional listener in the virtual space in dependence upon the point of view of the notional listener, wherein
during the first mode there is a first dependency of the relative position of the virtual sound object from the notional listener upon a currently determined relative position of the virtual sound object from the notional listener in the virtual space based on the current measured location of a user in a real space and
during the second mode there is a second dependency of the relative position of the virtual sound object from the notional listener upon a currently determined relative position of the virtual sound object from the notional listener in the virtual space based on the current measured location of the user in the real space,
wherein the first dependency is a higher dependency than the second dependency.

According to various, but not necessarily all, embodiments of the invention there is provided an apparatus comprising:
at least one processor; and
at least one memory including computer program code
the at least one memory and the computer program code configured to, with the at least one processor, cause the apparatus 30 at least to perform:
switching between a first mode for controlling a relative position of a virtual sound object from a notional listener in a virtual space in dependence upon a point of view of the notional listener
and a second mode for controlling the relative position of the virtual sound object from the notional listener in the virtual space in dependence upon the point of view of the notional listener, wherein
during the first mode there is a first dependency of the relative position of the virtual sound object from the notional listener upon a currently determined relative position of the virtual sound object from the notional listener in the virtual space based on the current measured location of a user in a real space and
during the second mode there is a second dependency of the relative position of the virtual sound object from the notional listener upon a currently determined relative position of the virtual sound object from the notional listener in the virtual space based on the current measured location of the user in the real space,
wherein the first dependency is a higher dependency than the second dependency.

According to various, but not necessarily all, embodiments of the invention there is provided a computer program that when run by a processor enables:
switching between a first mode for controlling a relative position of a virtual sound object from a notional listener in a virtual space in dependence upon a point of view of the notional listener
and a second mode for controlling the relative position of the virtual sound object from the notional listener in the virtual space in dependence upon the point of view of the notional listener, wherein during the first mode there is a first dependency of the relative position of the virtual sound object from the notional listener upon a currently determined relative position of the virtual sound object from the notional listener in the virtual space based on the current measured location of a user in a real space and
during the second mode there is a second dependency of the relative position of the virtual sound object from the notional listener upon a currently determined relative position of the virtual sound object from the notional listener in the virtual space based on the current measured location of the user in the real space,
wherein the first dependency is a higher dependency than the second dependency.

According to various, but not necessarily all, embodiments of the invention there is provided examples as claimed in the appended claims.

BRIEF DESCRIPTION OF FIGURES

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

DEFINITIONS

Figure 4:
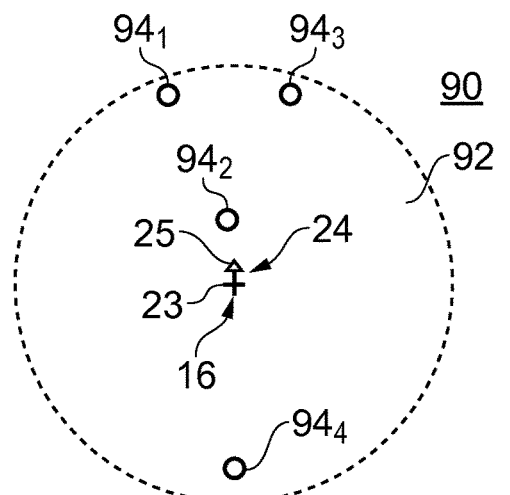
FIG. 4 illustrates, from a top perspective, an example of a sound space 90 that corresponds to the virtual visual space.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or position. A rendered sound object represents sounds rendered from a particular position.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view within the real space.

"real visual scene" refers to a representation of the real space viewed from a particular point of view within the real space.

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user;

"virtual reality" in this document refers to a form of mediated reality in which a user experiences a fully artificial environment (a virtual visual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view (location and/or orientation) determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"notional listener" defines the point of view in virtual space used to generate a perspective-mediated sound scene, irrespective of whether or not a user is actually listening "notional viewer" defines the point of view in virtual space used to generate a perspective-mediated visual scene, irrespective of whether or not a user is actually viewing.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual visual objects 21, however, each Fig illustrates a different point of view 24. The location and direction of a point of view 24 can change independently. The direction but not the location of the point of view 24 changes from FIG. 1A to FIG. 1B. The direction and the location of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20. For example, a user may be able to select and move the virtual object 21.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a location 23 of the point of view 24 within the virtual visual space 20 may be changed and/or a direction or orientation 25 of the point of view 24 within the virtual visual space 20 may be changed. If the virtual visual space 20 is three-dimensional, the location 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in location 23 and/or direction 25 and user action then changes the location and/or direction of the point of view 24 continuously. Alternatively, the point of view 24 may have discrete quantised locations 23 and/or discrete quantised directions 25 and user action switches by discretely jumping between the allowed locations 23 and/or directions 25 of the point of view 24.

FIG. 3A illustrates an example of a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a perspective corresponding to the point of view 24 in the virtual visual space 20 of FIG. 1A. The real visual scene content is determined by that corresponding point of view 24 and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view at the same time, processed to generate an image from a single point of view 24.

In augmented reality, the virtual content 28 is one or more virtual objects 21. The virtual scene 22 comprises the real scene 12, augmented or not by virtual content in dependence upon the point of view 24 of the user 18.

In virtual reality, the virtual content 28 is the whole of the virtual scene and all virtual objects 21 within it. The virtual scene 22 comprises only the virtual content 28 determined in dependence upon the point of view 24 of the user 18.

FIG. 4 illustrates, from a top perspective, an example of a sound space 90 that corresponds to the virtual visual space 20. FIG. 4 is a two-dimensional projection or cross-section of the three dimensional sound space 90. The sound space 90 defines a sound scene 92.

In some but not necessarily all examples, the virtual visual space 20 and the sound space 90 may be corresponding and form a combined virtual space 90,20. "Correspondence" or "corresponding" when used in relation to a sound space and a virtual visual space means that the sound space 90 and virtual visual space 20 are time and space aligned as combined virtual space 90,20, that is they are the same space at the same time.

The correspondence between virtual visual space 20 and sound space 90 results in correspondence between the virtual visual scene 22 and the sound scene 92 to form a combined virtual scene 92,22. "Correspondence" or "corresponding" when used in relation to a sound scene 92 and a virtual visual scene 22 means that the sound space 90 and virtual visual space 20 are corresponding and a notional (virtual) listener whose point of view defines the sound scene 92 and a notional (virtual) viewer whose point of view defines the virtual visual scene 22 are at the same location and orientation, that is they have the same point of view 24.

In FIG. 4, the sound space 90 and the virtual visual space 20 form a combined virtual space 90,20. The sound space 90 is an arrangement of sound sources 94 in a three-dimensional space. In this example, the sound space 90 is a rendered sound space and the sound sources 94 comprise sound objects 110.

The sound space 90 defines a sound scene 92 that corresponds to the virtual visual scene 22. The sound scene 92 and the virtual visual scene 22 form a combined virtual scene 92, 22.

The sound scene 92 is a representation of the sound space 90 listened to from a particular point of view 24 of a virtual listener (user) 16 within the sound space 90. The sound scene 92 is first person perspective-mediated. The user's real point of view 14 determines the point of view 24 within the sound space, changing the sound scene 92.

In this example, the point of view 24 within the sound space 90 corresponds to the point of view 24 within the virtual visual space 20 and the same label is used. The virtual scene 92,22 is first person perspective-mediated. The user's real point of view 14 determines the point of view 24 of the virtual user 16 within the combined virtual space 90, 20, changing the combined virtual scene 92, 22.

Correspondence in this sense means that there is a one-to-one mapping between the sound space 90 and the virtual visual space 20 such that a position in the sound space 90 has a corresponding position in the virtual visual space 20 and a position in the virtual visual space 20 has a corresponding position in the sound space 90. Correspondence in this sense means that there is a one-to-one mapping between the sound scene 92 and the virtual visual scene 22 such that a position in the sound scene 92 has a corresponding position in the virtual visual scene 22 and a position in the virtual visual scene 22 has a corresponding position in the sound scene 92. Corresponding also means that the coordinate system of the sound space 90/sound scene 92 and the coordinate system of the virtual visual space 20/virtual visual scene 22 are in register such that an object is positioned as a sound object in the sound scene and as a visual object in the visual scene at the same common position from the perspective of a virtual user 16.

In this illustrated example, the user actions determine the point of view 24 within the sound space 90 (and virtual visual space 20), changing the sound scene 92 and the virtual visual scene 22 simultaneously. For example, a location 23 of the point of view 24 within the virtual space 92, 20 may be changed and/or a direction or orientation 25 of the point of view 24 within the virtual space 92, 20 may be changed. If the virtual space 92, 20 is three-dimensional, the location 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in location 23 and/or direction 25 and user action then changes the location and/or direction of the point of view 24 continuously. Alternatively, the point of view 24 may have discrete quantised locations 23 and/or discrete quantised directions 25 and user action switches by discretely jumping between the allowed locations 23 and/or directions 25 of the point of view 24.

The functionality that enables control of a virtual visual space 20 and the virtual visual scene 26 dependent upon the virtual visual space 20 and the functionality that enables control of a sound space and the sound scene 92 dependent upon the sound space 90 may be provided by the same apparatus, system, method or computer program.

Sound and Vision

Figure 5:
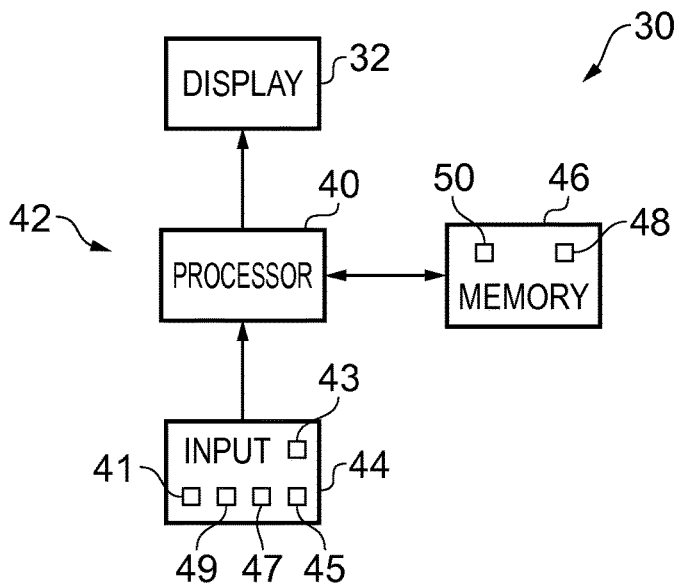
FIG. 5 illustrates an example of an apparatus that is operable to enable mediated reality and/or augmented reality and/or virtual reality.

FIG. 5 illustrates an example of an apparatus 30 that is operable to enable mediated reality and/or augmented reality and/or virtual reality.

The apparatus 30 comprises a rendering device or devices 32, which may render information to a user visually via a display, aurally via one or more audio outputs 32, for example via loudspeakers, and/or haptically via a haptic device.

The audio output device 32 may comprise one or more spatially distributed audio sources. For example, binaural loudspeakers may be separated in a head mounted audio (HMA) device, loudspeakers may be spatially separated in a sound bar or in a distributed loudspeaker arrangement e.g. 5.1 or 7.1 surround sound.

The display 32 is for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display may be a head-mounted display (HMD), a hand-portable display or television display or some other display.

The rendering device or devices 32 are controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 5 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 6A & 6B. The processor 40 by reading the memory 46 is able to load and execute the computer program 48.

The apparatus 30 may enable user-interactive mediation for mediated reality and/or augmented reality and/or virtual reality. The input circuitry 44 detects user actions using user input 43. These user actions are used by the controller 42 to determine what happens within the virtual space. This may enable interaction with a visual element 28 within the virtual visual space 20.

The apparatus 30 may enable perspective mediation for mediated reality and/or augmented reality and/or virtual reality. The input circuitry 44 detects user actions. These user actions are used by the controller 42 to determine the point of view 24 within the virtual space, changing the virtual scene. The point of view 24 may be continuously variable in location and/or direction and user action changes the location and/or direction of the point of view 24. Alternatively, the point of view 24 may have discrete quantised locations and/or discrete quantised directions and user action switches by jumping to the next location and/or direction of the point of view 24.

The apparatus 30 may enable first person perspective for mediated reality, augmented reality or virtual reality. The input circuitry 44 detects the user's real point of view 14 using point of view sensor 45. The user's real point of view is used by the controller 42 to determine the point of view 24 within the virtual space, changing the virtual scene. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze.

A head-mounted apparatus 30, may be used to enable first-person perspective mediation by measuring a change in location and/or a change in orientation of the user's head and/or a change in the user's direction of gaze. The head-mounted apparatus 30 may, for example, operate as a head mounted audio (HMA) device, a head mounted display (HMD) device or a combined head mounted display and audio (HMDA) device, In some but not necessarily all examples, the apparatus 30 comprises as part of the input circuitry 44 point of view sensors 45 for determining changes in the real point of view.

For example, positioning technology such as GPS, HAIP (high-accuracy indoor positioning), triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with structured light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
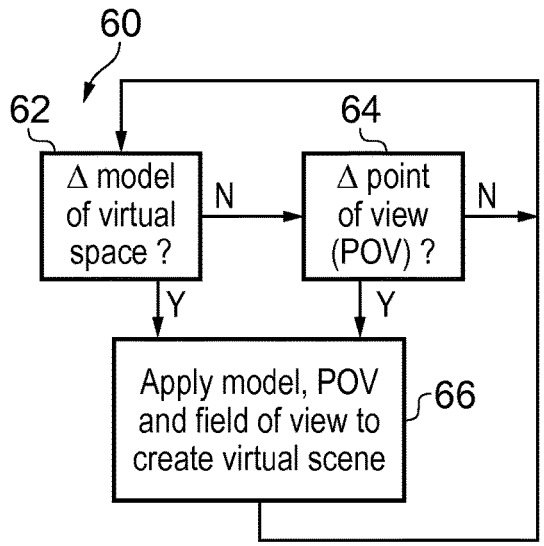
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The controller 42 stores and maintains a model 50 of the virtual space 20 and a mapping between the physical space and the virtual space.

The model may be provided to the controller 42 or determined by the controller 42. For example, sensors in input circuitry 44 may optionally be used to create overlapping depth maps of the real space from different points of view, virtual content is added, to produce and change the model.

Each real location 13 in the physical space 10, through the mapping 30, has a corresponding virtual location 23 in the virtual space 20 and vice versa. Each real orientation 15 in the physical space 10, through the mapping 30, has a corresponding virtual orientation 25 in the virtual space 20 and vice versa.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a location of the object.

At block 62 it is determined whether or not the model of the virtual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is limited by the field of view 26 to produce the virtual visual scene 22. The projection may also define the sound scene. The method then returns to block 62.

Figure 6B:
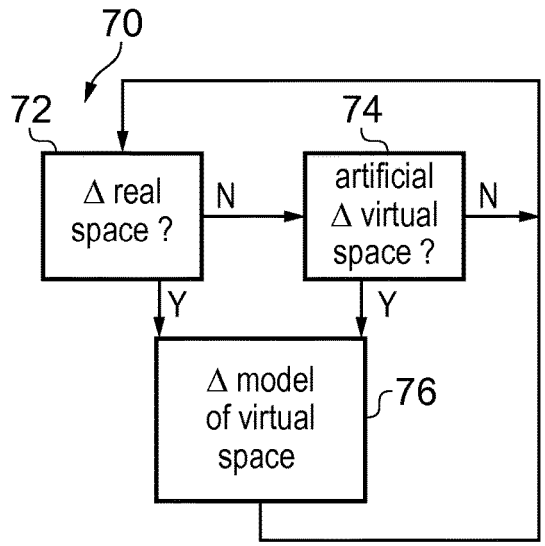
FIG. 6B illustrates an example of a method for updating a model of the virtual visual space for augmented reality.

FIG. 6B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in the FIGS. 6A & 6B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Visual Rendering

Figure 7A:
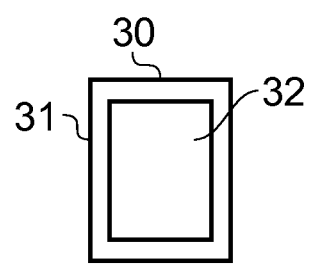
FIGS. 7A and 7B illustrate examples of apparatus that enable display of at least parts of the virtual visual scene to a user.
Figure 7B:
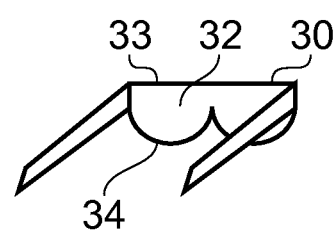

FIGS. 7A and 7B illustrate examples of apparatus 30 that enable display of at least parts of the virtual visual scene 22 to a user and rendering of audio to a user.

FIG. 7A illustrates a handheld apparatus 31 comprising a display screen as display 32 that displays images to a user and is used for displaying the virtual visual scene 22 to the user.

The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30. The handheld apparatus 31 may house the sensors 45 for determining changes in the real point of view from a change in a user controlled device such as, for example, actuation of buttons, virtual buttons, slider, joystick, etc. The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 7B illustrates a head-mounted apparatus 33 comprising a display 32 and/or audio output 32 that renders content to a user. The head-mounted apparatus 33 may be moved automatically when a head of the user moves.

A head-mounted apparatus 33 comprising a display 32 may be referred to as a head-mounted display (HMD) device.

A head-mounted apparatus 33 comprising an audio output 32 (e.g. a loudspeaker) may be referred to as a head-mounted audio (HMA) device.

The head-mounted apparatus 33 may house the sensors 44 (not illustrated) for point of view detection that detect a location and orientation of the apparatus 33 or an orientation of the apparatus 33.

The head-mounted apparatus 33 may house the sensors 45 (not illustrated) for gaze direction detection and/or selection gesture detection.

The head-mounted apparatus 33 may be a see-through HMD arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Referring back to FIG. 5, an apparatus 30 may enable user-interactive mediation for mediated reality and/or augmented reality and/or virtual reality. The input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes or moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

Figure 8A:
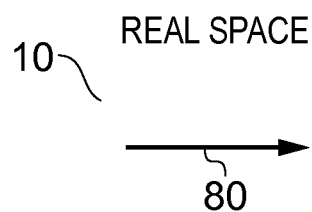
FIG. 8A, illustrates an example of a gesture in real space

Referring to FIG. 8A, a particular action 80 in the real space 10 is an action user input used as a 'user control' event by the controller 42 to determine what happens within the virtual visual space 20. An action user input is an action 80 that has meaning to the apparatus 30 as a user input.

Figure 8B:
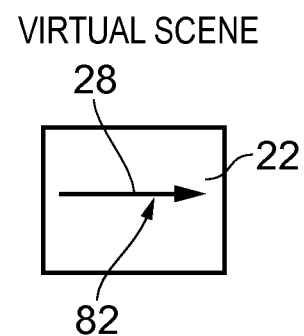
FIG. 8B, illustrates a corresponding representation rendered, in the virtual visual scene, of the gesture in real space.

Referring to FIG. 8B, illustrates that in some but not necessarily all examples, a corresponding representation of the action 80 in real space is rendered in the virtual visual scene 22 by the apparatus 30. The representation involves one or more visual elements 28 moving 82 to replicate or indicate the action 80 in the virtual visual scene 22.

An action 80 may be static or moving. A moving action may comprise a movement or a movement pattern comprising a series of movements. For example it could be making a circling motion or a side to side or up and down motion or the tracing of a sign in space. A moving action may, for example, be an apparatus-independent action or an apparatus-dependent action. A moving action may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

An action 80 may be a non-contact action. A non-contact action does not contact the sensors at any time during the action.

An action 80 may be an absolute action that is defined in terms of an absolute displacement from the sensors. Such an action may be tethered, in that it is performed at a precise location in the real space 10. Alternatively an action 80 may be a relative action that is defined in terms of relative displacement during the action. Such an action may be un-tethered, in that it need not be performed at a precise location in the real space 10 and may be performed at a large number of arbitrary locations.

An action 80 may be defined as evolution of displacement, of a tracked point relative to an origin, with time. It may, for example, be defined in terms of motion using time variable parameters such as displacement, velocity or using other kinematic parameters. An un-tethered action may be defined as evolution of relative displacement $\Delta d$ with relative time $\Delta t$.

A action 80 may be performed in one spatial dimension (1D action), two spatial dimensions (2D action) or three spatial dimensions (3D action).

The action 80 may be a gesture.

Record/Modify Sound Objects

Figure 9:
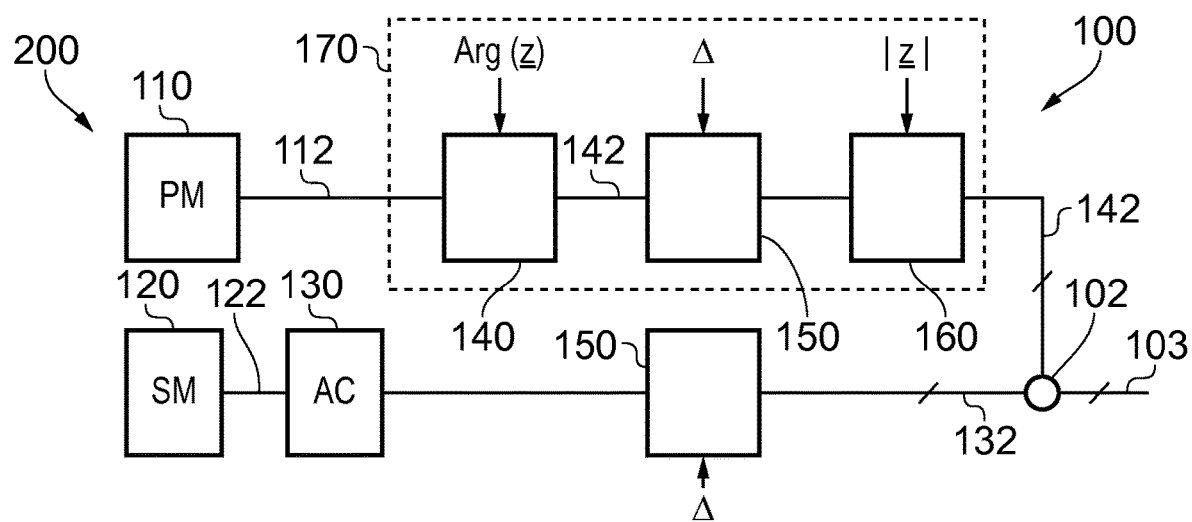
FIG. 9 illustrates an example of a system for modifying a rendered sound scene.

FIG. 9 illustrates an example of a system 100 and also an example of a method 200 for controlling rendering of a sound space 90 for a notional (virtual) listener 16 at an arbitrary location 23 (the origin) and orientation 25 within the sound space 90 at a particular location and/or orientation from the listener 16.

A sound space 90 is an arrangement of sound sources 94 in a three-dimensional space. A sound space 90 may be defined in relation to recording sounds (a recorded sound space) or in relation to rendering sounds (a rendered sound space).

The sound space 90 may optionally comprise one or more portable sound objects 110 and/or may optionally comprise one or more static sound objects 120.

The relative location of a sound object from the origin may be represented by the vector z. The vector z therefore positions the sound object 110 relative to a notional (virtual) listener 16.

The relative orientation 25 of the notional listener 16 at the origin may be represented by the value $\Delta$. The orientation value $\Delta$ defines the notional listener's 'point of view' which defines the sound scene. The sound scene is a representation of the sound space listened to from a particular point of view 24 within the sound space 90.

The audio signals 122 representing a static sound object 120 are, if necessary, coded by audio coder 130 into a multichannel audio signal 132. If multiple static sound objects are present, the audio signals 122 for each would be separately coded by an audio coder into a multichannel audio signal.

The audio coder 130 may be a spatial audio coder such that the multichannel audio signals 132 represent the sound space and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc or to change coding from one format to another.

The multichannel audio signals 132 are mixed by mixer 102 with multichannel audio signals 142 representing one or more portable sound objects 110 to produce a multi-sound object multichannel audio signal 103 that represents the sound scene relative to the origin and which can be rendered by an audio decoder corresponding to the audio coder 130 to reproduce a sound scene to a listener that corresponds to the sound scene when the listener is at the origin.

The multichannel audio signal 142 for the, or each, portable sound object 110 is processed before mixing to take account of any movement of the portable sound object relative to the origin.

The audio signals 112 are processed by the positioning block 140 to adjust for movement of the portable sound object 110 relative to the origin. The positioning block 140 takes as an input the vector z or some parameter or parameters dependent upon the vector z. The vector z represents the relative location of the portable sound object 110 relative to the origin.

The positioning block 140 may be configured to adjust for any time misalignment between the audio signals 112 and the audio signals 122 so that they share a common time reference frame. This may be achieved, for example, by correlating naturally occurring or artificially introduced (non-audible) audio signals that are present within the audio signals 112 with those within the audio signals 122. Any timing offset identified by the correlation may be used to delay/advance the audio signals 112 before processing by the positioning block 140.

The positioning block 140 processes the audio signals 112, taking into account the relative orientation (Arg(z)) of that portable sound object relative to the origin.

The audio coding of the audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable sound object 110 in the sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by Δ, if necessary. Similarly, an orientation block 150 may be used to rotate the multichannel audio signals 132 by Δ, if necessary.

The functionality of the orientation block 150 is very similar to the functionality of the orientation function of the positioning block 140 except it rotates by A instead of Arg(z).

In some situations, for example when the sound scene is rendered to a listener through a head-mounted audio output device 30, for example headphones using binaural audio coding, it may be desirable for a portion of the rendered sound space 90 to remain fixed in real space 10 when the listener turns their head in space. This means that the rendered sound space 90 needs to be rotated relative to the audio output device 30 by the same amount in the opposite sense to the head rotation. The orientation of the portion of the rendered sound space 90 tracks with the rotation of the listener's head so that the orientation of the rendered sound space 90 remains fixed in space and does not move with the listener's head.

The portable sound object signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 10:
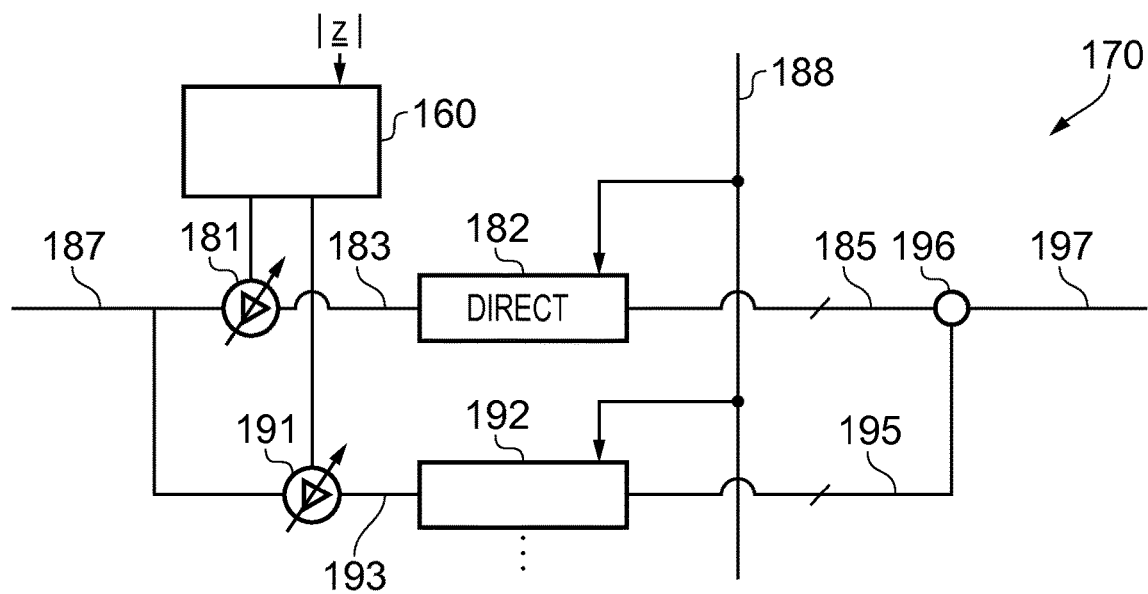
FIG. 10 illustrates an example of a module which may be used, for example, to perform the functions of the positioning block, orientation block and distance block of the system.

FIG. 10 illustrates a module 170 which may be used, for example, to perform the method 200 and/or functions of the positioning block 140, orientation block 150 and distance block 160 in FIG. 9. The module 170 may be implemented using circuitry and/or programmed processors.

The Figure illustrates the processing of a single channel of the multichannel audio signal 142 before it is mixed with the multichannel audio signal 132 to form the multi-sound object multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 90.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable sound object 110 (moving sound object) in the recorded sound space and the orientation A of the rendered sound space 90 relative to the notional listener/audio output device 300.

The location of the moving sound object changes as the portable object 110 moves in the recorded sound space and the orientation of the rendered sound space changes as a head-mounted audio output device rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by Δ, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable sound object signals 112 and perform the functions of:
(i) changing the relative location (orientation Arg(z) and/or distance |z|) of a rendered sound object, from a listener in the rendered sound space and
(ii) changing the orientation of the rendered sound space (including the rendered sound object located according to (i)).

It should also be appreciated that the module 170 may also be used for performing the function of the orientation block 150 only, when processing the audio signals 122. However, the direction of arrival signal will include only Δ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only Δ and does not include Arg(z).

Modes

The positioning of a sound source 94, for example a sound object 110, has been described above as being dependent upon the vector z which represents the relative position of a virtual sound object 110 relative to the virtual listener 16.

In the following, the vector $z_s(t)$ will be used in its place for the purpose of sound object positioning.

As previously described, changes in the virtual orientation 25 of the virtual listener 16 are controlled via Δ. If the virtual orientation has a unit vector o(t), then Δ is Arg[o(t)].

Figure 13:
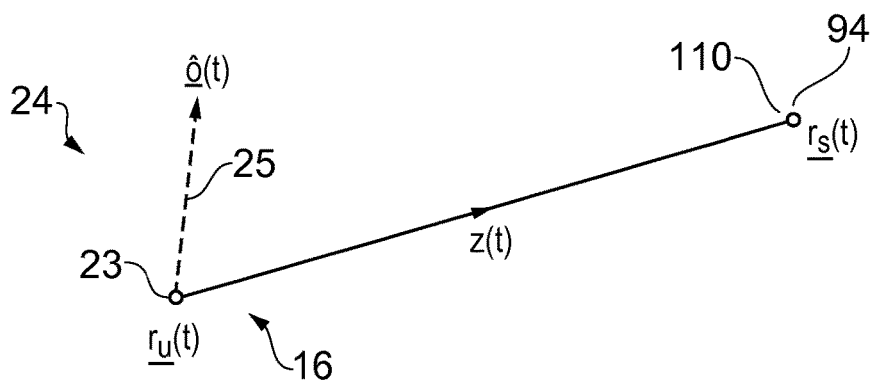
FIG. 13 illustrates an example of the vector z(t) representing the current relative position of a virtual sound object relative to a virtual listener.

As illustrated in FIG. 13, the vector z(t) will be used to represent the current relative position of a virtual sound object 110 relative to the virtual listener 16. In some modes, but not all modes of operation, $z_s(t)$ may equal z(t), however in other modes of operation they are unequal.

The current location of a virtual sound object 110 is defined by vector $r_s(t)$. The current location of the virtual listener 16 is defined by vector $r_u(t)$. The current relative position of a virtual sound object 110 relative to the virtual listener 16 is: $z(t)=r_s(t)-r_u(t)$.

"Current" means the most recent and closest to current time. It is the closest to real-time and is the most contemporaneous.

There is a mapping that maps a current location 13 of the user 18 in real space 10, defined by a vector $R_u(t)$, to the current location 23 of the virtual listener 16 in virtual space 90, defined by vector $r_u(t)$, and that maps the current orientation 15 of the user 18 defined by a vector O(t) in real space 10 to the current orientation 25 of the virtual listener 16 defined by vector o(t) in virtual space 90.

In a first mode of operation, the relative position $z_s(t)$ of a virtual sound object 110 relative to the virtual listener 16 has a first dependency upon the currently determined relative position z(t) of the virtual sound object 110 from the notional listener 16 in the virtual space 90 based on the current measured location $R_u(t)$ of the user 18 in the real space 10.

In a second mode of operation, different to the first mode of operation, the relative position $z_s(t)$ of a virtual sound object 110 relative to the virtual listener 16 has a second dependency upon the currently determined relative position z(t) of the virtual sound object 110 from the notional listener 16 in the virtual space 90 based on the current measured location $R_u(t)$ of a user 18 in the real space 10.

The first dependency is higher than the second dependency.

A higher (or greater) dependency with respect to a variable means a greater or larger magnitude of the differential with respect to that variable.

Therefore $|d\ z_s(t)/d\ z(t)|$ is greater for the first mode than the second mode.

$|d\ z_s(t)/d\ R_u(t)|$ is greater for the first mode than the second mode.

Figure 11:
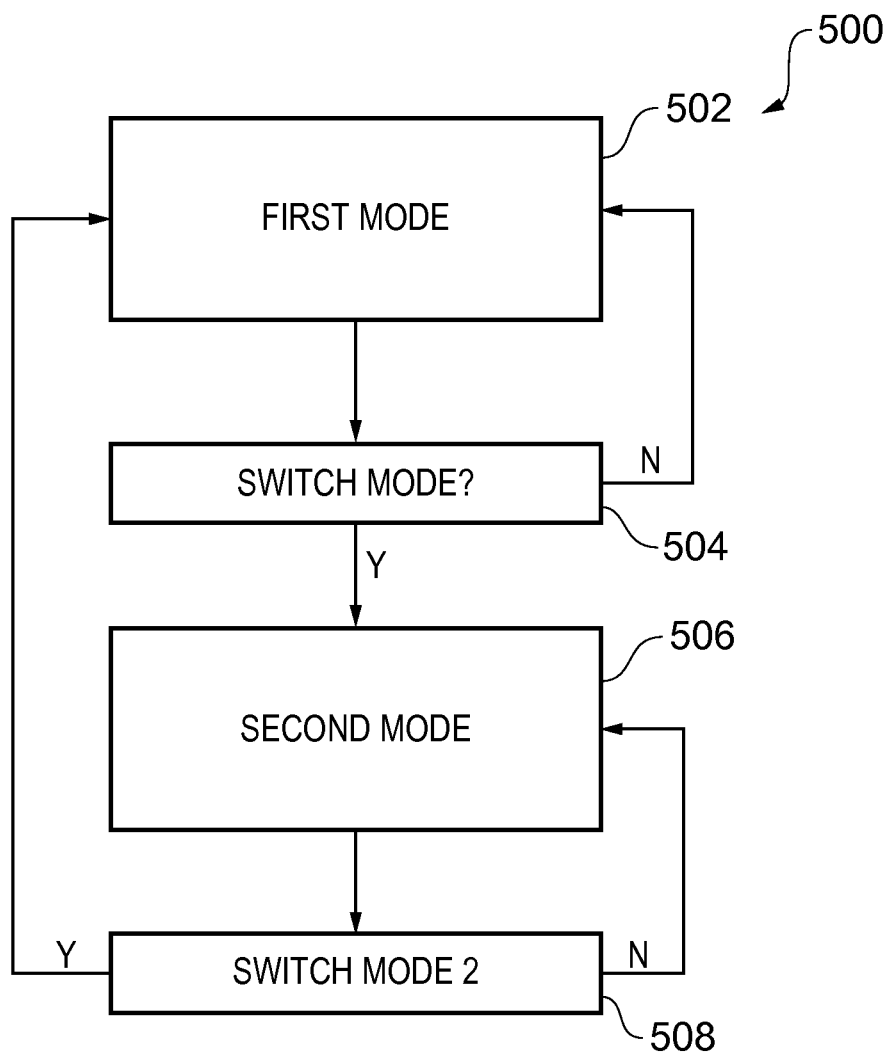
FIG. 11 illustrates an example of a method for controlling a mode of operation of first-person-perspective mediated reality.

FIG. 11 illustrates an example of a method 500 for controlling a mode of operation of first-person-perspective mediated reality.

The method 500 comprises at block 502 enabling a first mode for controlling a relative position $z_s(t)$ of a virtual sound object 110 from a notional listener 16 in a virtual space 90 in dependence upon a point of view 24 of the notional listener 16. The point of view 14 of the notional listener 16 changes with the point of view 14 of the user 18. The point of view 14 of the user 18 is dependent upon the orientation 15 of the user 18 e.g. O(t) and may additionally be dependent upon the location 13 of the user 18 e.g. $R_u(t)$.

During the first mode, there is a higher dependency of the relative position $z_s(t)$ of the virtual sound object 110 from the notional listener 16 upon a currently determined relative position z(t) of the virtual sound object 110 from the notional listener 16 in the virtual space 90 based on the current measured location $R_u(t)$ of a user 18 in a real space 10.

The method then comprises at block 504 automatically switching from the first mode to the second mode.

The method 500 then comprises at block 502 automatically enabling a second mode for controlling a relative position of the virtual sound object 110 from the notional listener 16 in the virtual space 90 in dependence upon the point of view 24 of the notional listener 16. The point of view 24 of the notional listener 16 may change with the point of view 14 of the user 18. The point of view 14 of the user 18 is dependent upon the orientation 15 of the user 18 e.g. O(t) and may additionally be dependent upon the location 13 of the user 18 e.g. $R_u(t)$.

During the second mode, there is a lower dependency of the relative position $z_s(t)$ of the virtual sound object 110 from the notional listener 16 upon a currently determined relative position z(t) of the virtual sound object 110 from the notional listener 16 in the virtual space 90 based on the current measured location $R_u(t)$ of a user 18 in a real space 10.

Then the method 500 comprises at block 508 automatically switching from the second mode to the first mode.

In addition to controlling the dependency of $z_s(t)$ on the current measured location $R_u(t)$ of a user 18 in a real space 10, it may also be desirable to control $\text{Arg}[z_s(t)]-\text{Arg}[o(t)]\}$. This may be achieved by controlling $\text{Arg}[z_s(t)]$ and/or controlling $\text{Arg}[z_s(t)]+\Delta$.

During the second mode, there may be a lower dependency (compared to the first mode) of the adapted relative position of the virtual sound object 110 from the notional listener 16 upon a currently determined relative position z(t) of the virtual sound object 110 from the notional listener 16 in the virtual space 90 based on the current measured location $R_u(t)$ of a user 18 in a real space 10 and the currently measured orientation O(t) of the user 18 in the real space 10. The point of view 14 of the user 18 in the real space 10 is defined by the orientation of the user 18 and optionally the location 13 of the user 18, that is, by the couplet $R_u(t)$, O(t).

Figure 12:
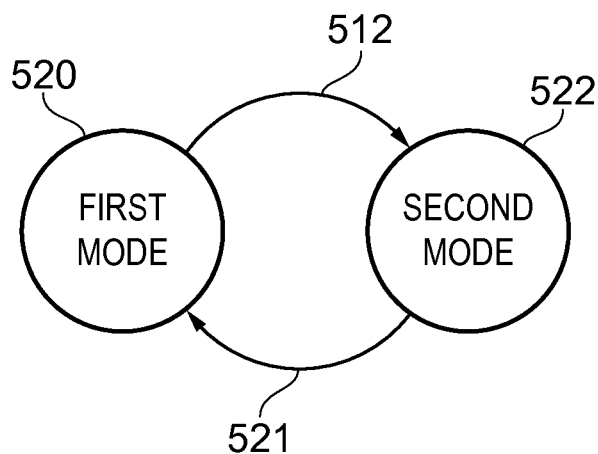
FIG. 12 illustrates an example of a state diagram.

FIG. 12 illustrates an example of a state diagram in which a first state 521 represents the first mode and a second state 522 represents the second mode. A transition 512 causes a state transition from the state 521 (first mode) to the state 522 (second mode). A transition 521 causes a state transition from the state 522 (second mode) to the state 521 (first mode mode).

The first state 521 corresponds to block 502 of FIG. 11. The second state 522 corresponds to block 506 of FIG. 11. The transition 512 corresponds to block 504 of FIG. 11. The transition 521 corresponds to block 508 of FIG. 11.

In some but not necessarily all examples, the transition 512 from the first mode to the second mode has as a necessary and sufficient condition or as a necessary condition that a distance $|z_s(t)|$ of the virtual sound object 110 from the notional listener 16 in virtual space decreases below a threshold, for example, 0.3 m.

In some but not necessarily all examples, the transition 512 from the first mode to the second mode has as a necessary and sufficient condition or as a necessary condition that a distance $|z_s(t)|$ of the virtual sound object 110 from the notional listener 16 in virtual space decreases below a threshold and some other additional criterion or criteria is satisfied.

For example, one example of an additional criterion is how long a criterion or criteria are satisfied for. Thus, the transition 512 from the first mode to the second mode may have as a necessary and sufficient condition or as a necessary condition that a distance $|z_s(t)|$ of the virtual sound object 110 from the notional listener 16 in virtual space decreases below a threshold for a predetermined threshold time.

For example, one example of an additional criterion uses a rate of change of a displacement parameter (e.g. distance $|z_s(t)|$ and/or orientation $\text{Arg}(z_s(t))$) of the virtual sound object 110 from the notional listener 16 in virtual space. Thus the transition 512 from the first mode to the second mode may occur when a distance $|z_s(t)|$ of the virtual sound object 110 from the notional listener 16 in virtual space decreases below a threshold AND the rate of change of the a displacement parameter (e.g. distance $|z_s(t)|$ and/or orientation $\text{Arg}(z_s(t))$) of the virtual sound object 110 from the notional listener 16 in virtual space passes a threshold. Thus the transition 512 from the first mode to the second mode may require that the rate of change of the distance $|z_s(t)|$ of the virtual sound object 110 from the notional listener 16 in virtual space decreases below a threshold and/or the transition 512 from the first mode to the second mode may require that the rate of change of the orientation $\text{Arg}(z_s(t))$ of the virtual sound object 110 from the notional listener 16 in virtual space increases above a threshold.

In some but not necessarily all examples, the transition 512 from the first mode to the second mode has as a necessary and sufficient condition or as a necessary condition that a time variation of a displacement parameter (e.g. distance $|z_s(t)|$ and/or orientation $\text{Arg}(z_s(t))$) of the virtual sound object 110 from the notional listener 16 in virtual space satisfies a criterion e.g. speed of closure between the notional listener and the sound object 110 $|d\ z_s(t)/dt|$ is greater than or less than a threshold value or rate of change of orientation between the notional listener and the sound object 110 $|d/dt\ \{\text{Arg}[z_s(t)]-\text{Arg}[o(t)]\}|$ or $|d/dt\ \{\text{Arg}[z_s(t)]\}|$ is greater than a threshold value.

In some but not necessarily all examples, the transition 512 from the first mode to the second mode has as a necessary and sufficient condition or as a necessary condition that a value for the uncertainty in correctly measuring the current measured location $R_u(t)$ of a user 18 in a real space 10 exceeds a threshold. In some example, the threshold may be based upon a distance $|z_s(t)|$ of the virtual sound object 110 from the notional listener 16.

In some but not necessarily all examples, the transition 521 from the second mode to the first mode has as a necessary and sufficient condition or as a necessary condition that a distance $|z_s(t)|$ of the virtual sound object 110 from the notional listener 16 in virtual space increases above a threshold, for example, 0.3 m.

In some but not necessarily all examples, the transition 521 from the second mode to the first mode has as a necessary and sufficient condition or as a necessary condition that a distance $|z_s(t)|$ of the virtual sound object 110 from the notional listener 16 in virtual space increases above a threshold and some other additional criterion or criteria is satisfied. For example, one example of an additional criterion is how long a criterion or criteria are satisfied for. Thus, the transition 521 from the second mode to the first mode may occur when distance $|z_s(t)|$ of the virtual sound object 110 from the notional listener 16 in virtual space increases above a threshold for a predetermined threshold time.

For example, one example of an additional criterion uses a rate of change of a displacement parameter (e.g. distance $|z_s(t)|$ and/or orientation $\text{Arg}(z_s(t))$) of the virtual sound object 110 from the notional listener 16 in virtual space. Thus the transition 521 from the second mode to the first mode may occur when a distance $|z_s(t)|$ of the virtual sound object 110 from the notional listener 16 in virtual space increases above a threshold AND the rate of change of the a displacement parameter (e.g. distance $|z_s(t)|$ and/or orientation $\text{Arg}(z_s(t))$) of the virtual sound object 110 from the notional listener 16 in virtual space passes a threshold. Thus the transition 521 from the second mode to the first mode may require that the rate of change of the distance $|z_s(t)|$ of the virtual sound object 110 from the notional listener 16 in virtual space increases above a threshold and/or the transition 521 from the second mode to the first mode may require that the rate of change of the orientation $\text{Arg}(z_s(t))$ of the virtual sound object 110 from the notional listener 16 in virtual space decreases below a threshold.

In some but not necessarily all examples, the transition 521 from the second mode to the first mode has as a necessary and sufficient condition or as a necessary condition that a time variation of a displacement parameter (e.g. distance $|z_s(t)|$ and/or orientation $\text{Arg}(z_s(t))$) of the virtual sound object 110 from the notional listener 16 of the virtual sound object 110 from the notional listener 16 in virtual space satisfies a criterion e.g. speed of separation between the notional listener and the sound object 110 $|d\ z_s(t)/dt|$ is less than or greater than a threshold value or rate of change of orientation between the notional listener and the sound object 110 $|d/dt\ \{\text{Arg}[z_s(t)]-\text{Arg}[o(t)]\}|$ or $|d/dt\ \{\text{Arg}[z_s(t)]\}|$ is less than a threshold value.

In some but not necessarily all examples, the transition 521 from the second mode to the first mode has as a necessary and sufficient condition or as a necessary condition that a value for the uncertainty in correctly measuring the current measured location $R_u(t)$ of a user 18 in a real space 10 exceeds a threshold that may be based upon a distance $|z_s(t)|$ of the virtual sound object 110 from the notional listener 16.

In some but not necessarily all examples, the condition C causes transition 512 and the condition NOT(C) causes transition 521. The thresholds for the transitions 512, 521 may therefore be the same-one transition occurs for passing the threshold in a first direction (e.g. exceeding the threshold) and the other transition occurs for passing the threshold in a second direction, opposite the first direction (e.g. no longer exceeding the threshold).

Figure 14A:
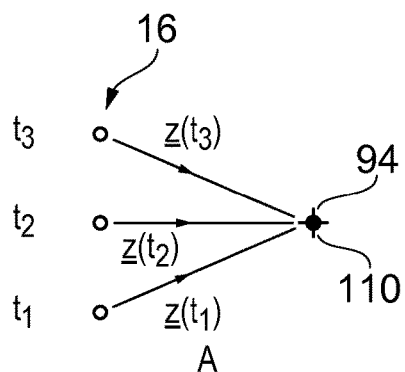
FIG. 14A and FIG. 14B illustrate different examples of a notional listener moving past a sound source.
Figure 14B:
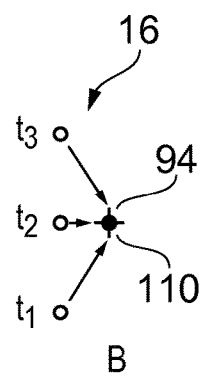

FIG. 14A and FIG. 14B illustrate examples of a notional listener 16 moving past a sound source 94 e.g. sound object 110, during time t1, t2, t3. The closest approach $\min(|z(t)|)$ is less for FIG. 14B than for FIG. 14A.

Figure 15A:
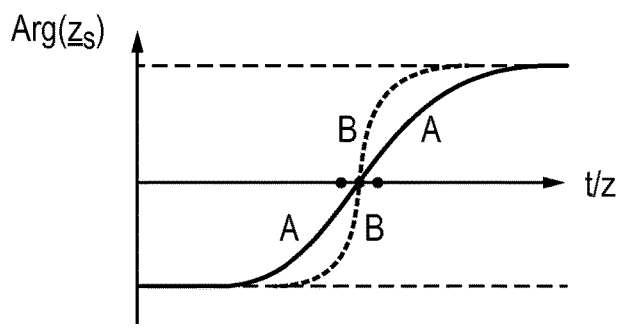
FIG. 15A illustrates an example of variation of orientation of a virtual sound object relative to a virtual listener with time.

FIG. 15A illustrates a variation of $\text{Arg}[z(t)]-\text{Arg}[o(t)]\}|$ with time. In this example, o(t) is constant so the Figure illustrates the variation of $\text{Arg}[z(t)]$. The trace A relates to the situation illustrated in FIG. 14A. The trace B relates to the situation illustrated in FIG. 14B.

Figure 15B:
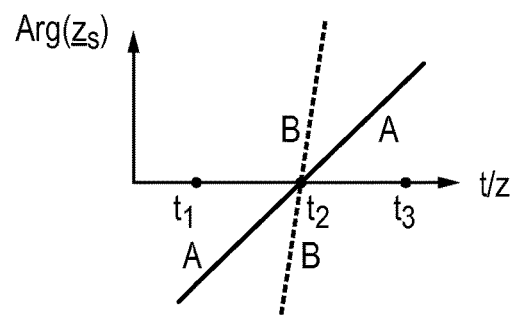
FIG. 15B illustrates a zoomed-n portion of FIG. 15A.

FIG. 15B illustrates a portion of FIG. 15A, corresponding to the time of closest approach of notional listener 16 and sound object 110, in greater detail. The rate of change of $\text{Arg}(z(t))$ is greater for trace B than trace A.

If there is some uncertainty concerning the measured point of view 14 of the user 18 in the real space defined by the orientation 15 of the user 18 and optionally the location 13 of the user 18, that is, by the couplet $R_u(t)$, O(t), then the effect will be greater for trace B than trace A. Switching from the first mode to the second mode mitigates this effect.

Figure 16A:
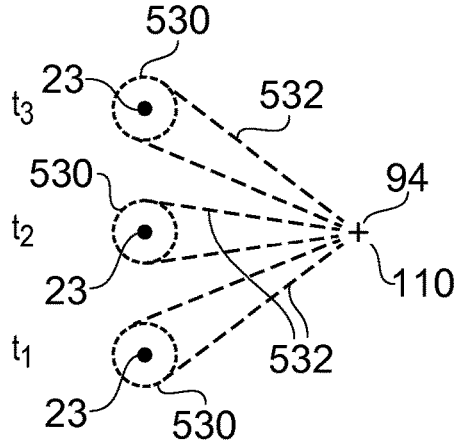
FIGS. 16A and 16B illustrate different examples of a notional listener, of uncertain location, moving past a sound source.
Figure 16B:
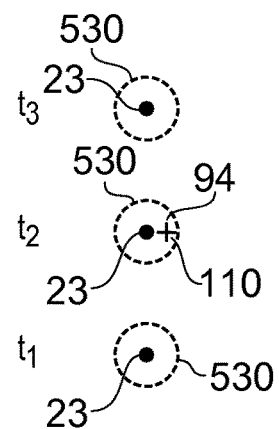

FIGS. 16A and 16B are similar to FIGS. 14A and 14B. FIG. 16A and FIG. 16B illustrate examples of a notional listener 16 moving past a sound source 94, e.g. sound object 110, during time t1, t2, t3. The closest approach $\min(z(t))$ is less for FIG. 16B than for FIG. 16A.

If there is some uncertainty concerning the measured location 13 of the user 18, there will be uncertainty in the location 23 of the notional listener 16. This uncertainty is illustrated by circles of uncertainty 530 for the virtual location 23 of the notional listener and any corresponding uncertainty 532 associated with the point of view 24 of the notional listener 16. The effect will be greater for FIG. 16B than FIG. 16A.

It is possible, for example, for the sound source 94 to switch it's bearing from the notional listener 16 randomly, the effect becoming more pronounced as the distance to the sound source 94 decreases and as the time spent near the sound source increases. It is possible, for example, for the sound source 94 to switch from the right hand side of the notional listener 16 to the left hand side of the listener 16 and back to the right hand side of the notional listener 16 because of uncertainty concerning the measured location 13 without any change in O(t) or o(t). Switching from the first mode to the second mode mitigates this effect.

Figure 17A:
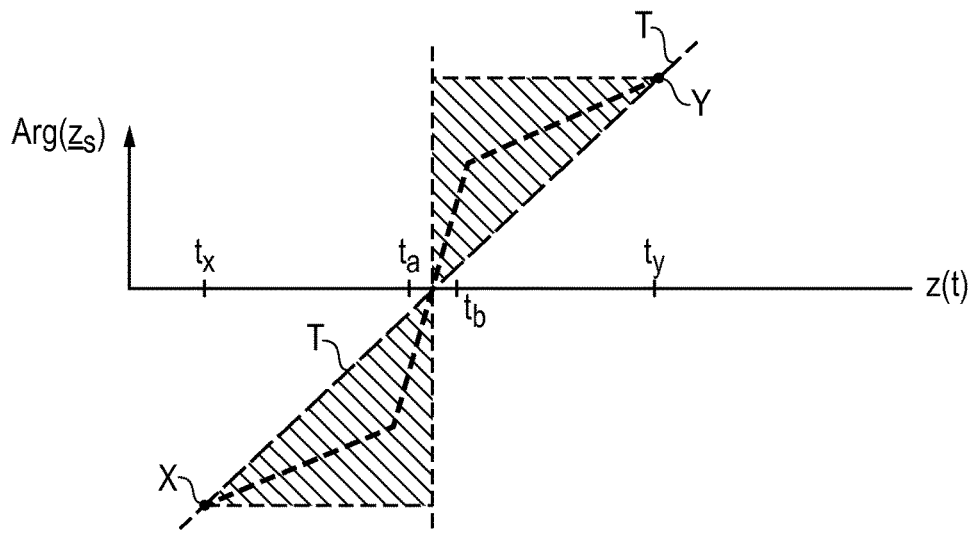
FIG. 17A illustrates allowable variations of orientation of a virtual sound object relative to a virtual listener with time in the second mode.

FIG. 17A illustrates a variation of $\text{Arg}[z(t)]-\text{Arg}[o(t)]\}|$ with time. In this example, o(t) is constant so the Figure illustrates variation in $\text{Arg}[z(t)]$.

Moving from left to right, up to point X the first mode is used, between X and Y the second mode is used and after Y the first mode is used again.

The dotted line T illustrates the relationship between relative orientation $\text{Arg}[z(t)]$ of the sound source 94 and the notional listener 16 according to the first mode. $\text{Arg}[z(t)]$ has a large variation between X at time $t_x$ and Y at time $t_x$. The average gradient m between X and Y is $(Y-X)/(t_y-t_x)$.

The hashed area illustrates the region occupied by the relationship between the relative orientation $\text{Arg}[z(t)]$ of the sound source 94 and the notional listener 16 according to the second mode.

During the second mode there is, for all or for the majority of the second mode, a lower dependency of the relative position $z_s(t)$ of the virtual sound object 110 from the notional listener 16 upon a currently determined relative position $z(t)$ of the virtual sound object 110 from the notional listener 16 in the virtual space 90 based on the current measured location $R_u(t)$ of a user 18 in a real space 10. In the expression, $|z_s(t)|\exp(i\{\text{Arg}[z_s(t)]-\text{Arg}[o(t)]\}$, the value $\text{Arg}[z_s(t)]-\text{Arg}[o(t)]$ has a lesser gradient, $d/dt\{\text{Arg}[z_s(t)]-\text{Arg}[o(t)]\}$, compared to the first mode, for all or for the majority of the second mode.

$$d/dt\{\text{Arg}[z_s(t)]\}<m, \text{ assuming } \text{Arg}[o(t)] \text{ is constant}$$

The rate of change of the vector between the notional listener 16 and the sound object 110, $d/dt\{\text{Arg}[z_s(t)]\}$, is controlled between time $t_x$ and time $t_y$.

As there is continuity at X and Y, there will be a discontinuity, for example, where the notional listener approaches closest to the sound source 94 between time $t_a$ and $t_b$.

The discontinuity may be smoothed over time, but still represents a large change in $\text{Arg}[z_s(t)]-\text{Arg}[o(t)]$ over a time $\Delta t=t_b-t_a$. As $\text{Arg}[o(t)]$ is constant:

$$\text{Arg}[z_s(t_b)]-\text{Arg}[z_s(t_a)]/\Delta t>m$$

In general, $(t_y-t_x)>>\Delta t$

In addition, on switching between the first mode and the second mode, the change in the relative position $z_s(t)$ of the virtual sound object 110 from the notional listener 16 is smoothed over time. The rate of change of rate of change of the relative position $z_s(t)$ does not exceed a threshold value n e.g. $d^2/dt^2\{\text{Arg}[z_s(t)]\}<n$.

Thus, during the second mode the relative position $z_s(t)$ of the virtual sound object 110 from the notional listener 16 is prevented from switching between a left hand side and a right hand side of the notional listener 16 except as a consequence of changes in orientation 25 of the notional listener 16 in the virtual space 90.

In some but not necessarily all examples, during the second mode, changes in the relative position $z_s(t)$ of the virtual sound object 110 from the notional listener 16 in response to changes in the current measured position $z(t)$ of user 18 in the real space 10 are damped but still dependent upon changes in orientation 25 of the notional listener 16 in the virtual space 90. For example, the magnitude of the rate of change with time of the current measured position z(t) of user 18 in the real space 10 is prevented from exceeding a threshold value e.g. $d/dt\{Arg[z_s(t)]\}<m$, assuming $Arg[o(t)]$ is constant, between $t_x$ and $t_a$ and between $t_b$ and $t_y$.

Figure 17B:
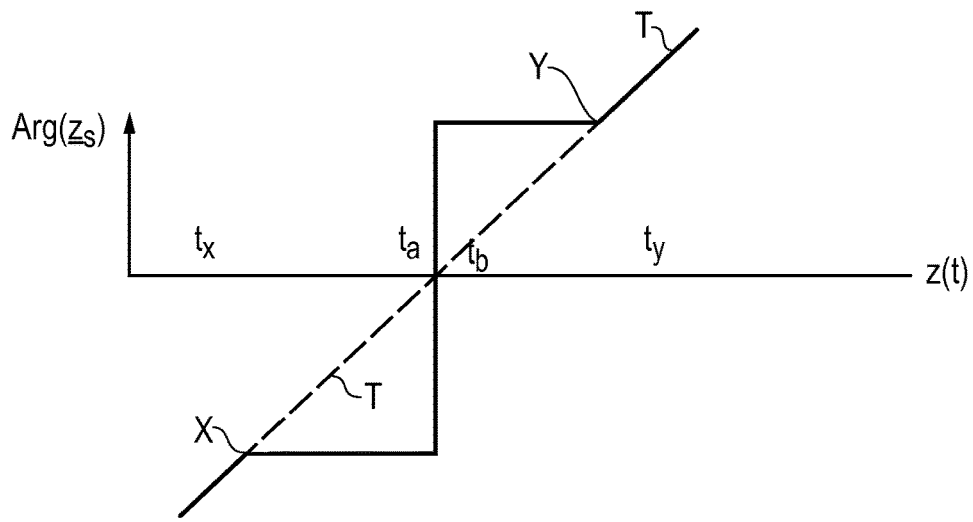
FIG. 17B illustrates an example of a variation of orientation of a virtual sound object relative to a virtual listener with time in the second mode.

In some but not necessarily all examples, during the second mode the relative position $z_s(t)$ of the virtual sound object 110 from the point of view 14 of the notional listener 16 is independent of the current measured position z(t) of user 18 in the real space 10 but still dependent upon changes in orientation 25 of the notional listener 16 in the virtual space 90. For example, as illustrated in FIG. 17B, $d/dt\{Arg[z_s(t)]\}=0$, assuming $Arg[o(t)]$ is constant, between $t_x$ and $t_a$ and between $t_b$ and $t_y$.

For example, during the second mode the relative position $z_s(t)$ of the virtual sound object from the notional listener is locked to an orientation of the notional listener in the virtual space e.g $Arg[z_s(t)]$=constant, between $t_x$ and $t_a$ and between $t_b$ and $t_y$.

Thus the rate of change of the vector between the notional listener 16 and the sound object 110, $d/dt\{Arg[z_s(t)]\}$, is controlled between time $t_x$ and time $t_y$. The distance represented by $|z_s(t)|exp(i\{Arg[z_s(t)]-Arg[o(t)]\})$, is therefore changed as a consequence of controlling $z_s(t)$, which would unless compensated for result in a change in volume of the sound object 110. In some but not necessarily all examples, during the second mode a volume of the sound object 110 is controlled to continue varying in dependence upon the relative position of the virtual sound object from the notional listener in the virtual space based on the current measured position of the user 18 in the real space 10.

Figure 18:
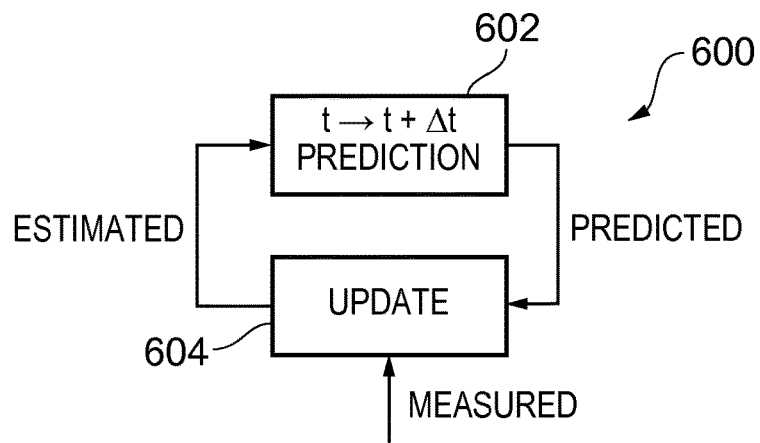
FIG. 18 Illustrates a Kalman filter.

FIG. 18 Illustrates how the currently determined relative position $z_s(t)$ of the virtual sound object 110 from the notional listener 16 in the virtual space 90 can be based on the current measured position z(t) of the user 18 in the real space 10, and a model-based position of the user. The model-based position of the user is produced using a Kalman filter 600, or another historically based, predictive filter.

The model may, for example be a constant velocity model. During a prediction phase 602 an estimated position from the previous iteration and the model are used to produce a predicted position and during a following update phase 604 the predicted position and the measured position are used to produce an estimated position for this iteration. The method then iterates. The iteration rate may, for example, be less than 20 Hz, it may for example be 4-10 Hz for position measurement.

A predicted position may be used instead of a measured position in the examples described above, in the first mode and/or the second mode.

The predicted position may be used instead of a position z(t) based on a measured position to determine whether or not switch between the first mode and the second mode.

From the foregoing, it will be appreciated that the apparatus 30 can comprise:
at least one processor 40; and
at least one memory 46 including computer program code 48 the at least one memory 46 and the computer program code 48 configured to, with the at least one processor 40, cause the apparatus 30 at least to perform:
controlling switching between a first mode for controlling a relative position of a virtual sound object 110 from a notional listener 16 in a virtual space 90 in dependence upon a point of view 24 of the notional listener 16
and a second mode for controlling the relative position of the virtual sound object 110 from the notional listener 16 in the virtual space 90 in dependence upon the point of view 24 of the notional listener 16, wherein
during the first mode there is a higher dependency of the relative position of the virtual sound object 110 from the notional listener 16 upon a currently determined relative position of the virtual sound object 110 from the notional listener 16 in the virtual space based on the current measured location 13 of a user 18 in a real space 10 and
during the second mode there is a lower dependency of the relative position of the virtual sound object 110 from the notional listener 16 upon a currently determined relative position of the virtual sound object 110 from the notional listener 16 in the virtual space 90 based on the current measured location 13 of the user 18 in the real space 10.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated in FIG. 5 as a single component/circuitry it may be implemented as one or more separate components/circuitry some or all of which may be integrated/removable and/or may provide permanent/semi-permanent/dynamic/cached storage.

Although the processor 40 is illustrated in FIG. 5 as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIGS. 11 and 18 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The method 500 may be performed by the apparatus 30, for example as previously described in relation to FIG. 5, 6A or 6B, the controller 42 of the apparatus 30 or the computer program 48. The apparatus 30 may a self-contained apparatus that performs all necessary functions itself or may be part of a system and delegate certain functions to other apparatuses or services.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising
at least one processor; and
at least one non-transitory memory including computer program code;
the at least one memory and the computer program code configured to, with the at least one processor, cause the apparatus at least to perform:
   switch between a first mode for controlling a relative position of a virtual sound object from a notional listener in a virtual space in dependence upon a point of view of the notional listener, and a second mode for controlling the relative position of the virtual sound object from the notional listener in the virtual space in dependence upon the point of view of the notional listener;
   during the first mode, determine the controlled relative position of the virtual sound object from the notional listener with a first dependency upon a currently determined relative position of the virtual sound object from the notional listener in the virtual space that is based on a current measured location of a user in a real space;
   during the second mode, determine the controlled relative position of the virtual sound object from the notional listener with a second dependency upon the currently determined relative position of the virtual sound object from the notional listener in the virtual space that is based on the current measured location of the user in the real space, wherein a transition from the first mode to the second mode is configured to occur when a level of uncertainty associated with measurement of the current measured location of the user in the real space is above a threshold; and
   during the second mode, damp changes in the controlled relative position of the virtual sound object from the notional listener, in response to changes in the current measured location of the user in the real space, in comparison to changes in the controlled relative position of the virtual sound object during the first mode in response to the changes in the current measured location of the user in the real space, but still dependent upon changes in orientation of the notional listener in the virtual space, wherein the first dependency is a higher dependency than the second dependency.

2. An apparatus as claimed in claim 1, wherein the at least one memory and the computer program code are configured to, with the at least one processor, cause the apparatus to perform:
   during the first mode, determine the controlled relative position of the virtual sound object from the notional listener with a third dependency upon a currently determined orientation of the notional listener in the virtual space that is based on a current measured point of view of the user in the real space; and
   during the second mode, determine the controlled relative position of the virtual sound object from the notional listener with a fourth dependency upon the currently determined orientation of the notional listener in the virtual space that is based on the current measured point of view of the user in the real space,
   wherein the third dependency is a higher dependency than the fourth dependency.

3. An apparatus as claimed in claim 1, wherein during the second mode:

the controlled relative position of the virtual sound object from the notional listener is not configured to be switched between a left hand side and a right hand side of the notional listener in response to changes in the current measured location of the user in the real space, and the controlled relative position of the virtual sound object from the notional listener is configured to be switched between the left hand side and the right hand side of the notional listener, in response to changes in the orientation of the notional listener in the virtual space.

4. An apparatus as claimed in claim 1, wherein during the second mode the controlled relative position of the virtual sound object from the notional listener is configured to be independent of the current measured location of user in the real space but still dependent upon the changes in the orientation of the notional listener in the virtual space.

5. An apparatus as claimed in claim 1, wherein during the second mode the controlled relative position of the virtual sound object from the notional listener is configured to be locked to the orientation of the notional listener in the virtual space.

6. An apparatus as claimed in claim 1, wherein the transition from the first mode to the second mode is further configured to occur when a distance of the virtual sound object from the notional listener in the virtual space decreases below a threshold, wherein, during the second mode, the determined controlled relative position of the virtual sound object from the notional listener is configured to maintain a position of the virtual sound object relative to the notional listener at a time of the transition.

7. An apparatus as claimed in claim 6, wherein a transition from the second mode to the first mode is configured to occur when the distance of the virtual sound object from the notional listener in the virtual space increases above a further threshold.

8. An apparatus as claimed in claim 1, wherein the transition from the first mode to the second mode is further configured to occur when a variation of the currently determined relative position of the virtual sound object from the notional listener over time satisfies a criterion.

9. An apparatus as claimed in claim 1, wherein on switching from the second mode to the first mode, the change in the controlled relative position of the virtual sound object from the notional listener is configured to be smoothed over time.

10. An apparatus as claimed in claim 1, wherein the controlled relative position of the virtual sound object from the notional listener is configured to be dependent upon the currently determined relative position of the virtual sound object from the notional listener in the virtual space based on the current measured location of the user in the real space, and a model-based location of the user.

11. An apparatus as claimed in claim 10, wherein the model-based location of the user is configured to be produced using a Kalman filter.

12. An apparatus as claimed in claim 11, wherein the model-based location of the user is configured to be produced using the Kalman filter operating at a rate less than 20 Hz.

13. A method comprising:
switching between a first mode for controlling a relative position of a virtual sound object from a notional listener in a virtual space in dependence upon a point of view of the notional listener, and a second mode for controlling the relative position of the virtual sound object from the notional listener in the virtual space in dependence upon the point of view of the notional listener;

during the first mode, determining the controlled relative position of the virtual sound object from the notional listener with a first dependency upon a currently determined relative position of the virtual sound object from the notional listener in the virtual space that is based on a current measured location of a user in a real space;

during the second mode, determining the controlled relative position of the virtual sound object from the notional listener with a second dependency upon the currently determined relative position of the virtual sound object from the notional listener in the virtual space that is based on the current measured location of the user in the real space, wherein a transition from the first mode to the second mode occurs when a level of uncertainty associated with measurement of the current measured location of the user in the real space is above a threshold; and during the second mode, damping changes in the controlled relative position of the virtual sound object from the notional listener, in response to changes in the current measured location of the user in the real space, in comparison to changes in the controlled relative position of the virtual sound object during the first mode in response to the changes in the current measured location of the user in the real space, but still dependent upon changes in orientation of the notional listener in the virtual space, wherein the first dependency is a higher dependency than the second dependency.

14. A method as claimed in claim 13, further comprising:
during the first mode, determining the controlled relative position of the virtual sound object from the notional listener with a third dependency upon a currently determined orientation of the notional listener in the virtual space that is based on a current measured point of view of the user in the real space; and during the second mode, determining the controlled relative position of the virtual sound object from the notional listener with a fourth dependency upon the currently determined orientation of the notional listener in the virtual space that is based on the current measured point of view of the user in the real space,
wherein the third dependency is a higher dependency than the fourth dependency.

15. A method as claimed in claim 13, wherein during the second mode the controlled relative position of the virtual sound object from the notional listener cannot switch between a left hand side and a right hand side of the notional listener except as a consequence of the changes in the orientation of the notional listener in the virtual space.

16. A method as claimed in claim 13, wherein during the second mode the controlled relative position of the virtual sound object from the notional listener is independent of the current measured location of user in the real space but still dependent upon changes in the orientation of the notional listener in the virtual space.

17. A method as claimed in claim 13, wherein during the second mode the controlled relative position of the virtual sound object from the notional listener is locked to the orientation of the notional listener in the virtual space.

18. A method as claimed in claim 13, wherein the transition from the first mode to the second mode occurs when a distance of the virtual sound object from the notional listener in the virtual space decreases below a threshold.

19. A method as claimed in claim 13, wherein the transition from the first mode to the second mode occurs when a variation of the currently determined relative position of the virtual sound object from the notional listener over time satisfies a criterion.

20. A non-transitory computer readable medium comprising program instructions stored thereon for performing at least the following:
- switch between a first mode for controlling a relative position of a virtual sound object from a notional listener in a virtual space in dependence upon a point of view of the notional listener, and a second mode for controlling the relative position of the virtual sound object from the notional listener in the virtual space in dependence upon the point of view of the notional listener;
- during the first mode enable determining of the controlled relative position of the virtual sound object from the notional listener with a first dependency upon a currently determined relative position of the virtual sound object from the notional listener in the virtual space that is based on a current measured location of a user in a real space;
- during the second mode enable determining of the controlled relative position of the virtual sound object from the notional listener with a second dependency upon the currently determined relative position of the virtual sound object from the notional listener in the virtual space that is based on the current measured location of the user in the real space, wherein a transition from the first mode to the second mode is configured to occur when a level of uncertainty associated with measurement of the current measured location of the user in the real space is above a threshold; and
- during the second mode, enable damping of changes in the controlled relative position of the virtual sound object from the notional listener, in response to changes in the current measured location of the user in the real space, in comparison to changes in the controlled relative position of the virtual sound object during the first mode in response to the changes in the current measured location of the user in the real space, but still dependent upon changes in orientation of the notional listener in the virtual space, wherein the first dependency is a higher dependency than the second dependency.

* * * * *